United States Patent
Blatchford et al.

(10) Patent No.: US 7,726,938 B2
(45) Date of Patent: Jun. 1, 2010

(54) TURBINE BLADE AND DIAPHRAGM CONSTRUCTION

(75) Inventors: David Paul Blatchford, Rugby (GB);
David John Nelmes, Rugby (GB);
Bryan Vincent Coltar, Rugby (GB)

(73) Assignee: Alstom Technology Ltd, Baden (CH)

( * ) Notice: Subject to any disclaimer, the term of this patent is extended or adjusted under 35 U.S.C. 154(b) by 604 days.

(21) Appl. No.: 11/727,627

(22) Filed: Mar. 27, 2007

(65) Prior Publication Data
US 2007/0224043 A1 Sep. 27, 2007

(30) Foreign Application Priority Data
Mar. 27, 2006 (GB) ................... 0605896.0

(51) Int. Cl.
*F01D 9/04* (2006.01)
(52) U.S. Cl. .................. 415/191; 415/211.1; 29/889.22
(58) Field of Classification Search ................. 415/191, 415/211.2; 29/889.22
See application file for complete search history.

(56) References Cited

U.S. PATENT DOCUMENTS

| | | | |
|---|---|---|---|
| 3,650,635 A | 3/1972 | Wachtell et al. | |
| 3,909,157 A | 9/1975 | Wachtell et al. | |
| 4,208,167 A | 6/1980 | Yasugahira et al. | |
| 4,365,933 A | 12/1982 | Langer et al. | |
| 5,522,134 A * | 6/1996 | Rowe et al. | 29/889.1 |
| 6,019,572 A * | 2/2000 | Cunha | 415/114 |
| 6,375,415 B1 * | 4/2002 | Burdgick | 415/115 |
| 6,969,233 B2 * | 11/2005 | Powis et al. | 415/191 |
| 2005/0106025 A1 | 5/2005 | Snook et al. | |
| 2005/0111983 A1 | 5/2005 | Goetzfried et al. | |
| 2005/0129519 A1 | 6/2005 | Beddard et al. | |

FOREIGN PATENT DOCUMENTS

| | | |
|---|---|---|
| DE | 28 49 747 A1 | 5/1980 |
| DE | 28 41 616 C3 | 6/1981 |
| DE | 601 20 549 T2 | 6/2007 |
| EP | 0 018 806 B1 | 7/1986 |
| EP | 1 148 208 A2 | 10/2001 |
| GB | 2 353 826 A | 3/2001 |
| JP | 2004-197622 A | 7/2004 |

OTHER PUBLICATIONS

Great Britain Patent Office Search Report dated Jul. 13, 2006.
Search Report issued by the German Patent Office in corresponding German Patent Application No. 10 2007 002 326.1; mailed Oct. 19, 2007.

* cited by examiner

*Primary Examiner*—Ninh H Nguyen
(74) *Attorney, Agent, or Firm*—Buchanan Ingersoll & Rooney PC

(57) ABSTRACT

An axial flow turbine blade and diaphragm construction comprises an annulus of static turbine blades 20 and inner and outer spacer rings 40, 42 having apertures 41, 43 shaped to accommodate inner and outer platform portions 22, 23 of the blades, whereby the platform portions and the spacer rings together form inner and outer port walls of the turbine diaphragm. A particular feature of the blades is that the inner and outer platform portions 22 and 23 have straight side edges 22B, 22C and 23B, 23C, which are joined to each other by curved leading edges 22D and 23D that in plan view have a shape that follows the edge of the corner fillet 24 in the region of the leading edge 26 of the aerofoil 21.

18 Claims, 4 Drawing Sheets

US 7,726,938 B2

TURBINE BLADE AND DIAPHRAGM CONSTRUCTION

FIELD OF THE INVENTION

The present invention relates to a novel construction for a ring of static blades for use in an axial flow turbine. It is particularly, but not exclusively, relevant to steam turbine diaphragms.

BACKGROUND OF THE INVENTION

The present invention is related to two known types of construction called "spacer band" and "platform". In the spacer band type of construction, shown in FIG. 1A, the blade aerofoils 1 are fixed to radially inner and outer structural members 2, 3 by means of inner and outer annular "bands" 4, 5, which are rolled from flat strip. Holes 6 are cut in the bands 4, 5 (e.g., by laser) to match the cross-section of the aerofoil shape, the ends of the aerofoils then being inserted into the holes and fillet welded into place. The bands are in turn welded to the inner and outer members 2, 3 to form the steam passage wall, or so-called "port wall".

An advantage of spacer band construction is that it involves a relatively small amount of machining of the blades compared to some other types of construction used in steam turbines. For example, in the so-called "platform" type of diaphragm construction, see FIG. 1B, the ends of the aerofoils 7 are integral with radially inner and outer "platforms" 8, 9, the aerofoils and platforms being machined from solid. A complete annulus of static blades is built up by assembling successive combined aerofoil/platform components 10 between inner and outer rings and welding the platforms to the rings. To illustrate the assembly process, an adjacent blade shape is shown in dashed lines. When the assembly is finished, the inner and outer platforms 8, 9 form the inner and outer port walls of the diaphragm.

This form of construction has performance advantages compared to the spacer band type, but has much higher manufacturing costs due to the extra material and machining involved in producing combined aerofoil/platform components 10. However, for some types of use—retrofitting of existing turbines, in particular—the performance benefit of the platform type of construction makes it the most economic solution despite its extra cost. This performance benefit arises from the fact that platform construction enables an aerodynamically advantageous fillet radius 11 in the corner between the aerofoil and the port wall, a smoother port wall and better maintenance of circularity in the port wall during operation of the turbine.

It is an object of the present invention to provide a type of diaphragm construction which has the good performance characteristics of the above platform type of construction, while being more economical to manufacture.

DEFINITIONS

Certain terms used in this specification have the meanings ascribed below.

Chord line: the line between the points where the front and the rear of a two-dimensional blade section would touch a flat surface if laid on the surface convex side up.

Corner fillet: a radiused corner where an aerofoil portion meets a platform portion to form an aerodynamically smooth transition between the aerofoil portion and the platform portion.

Pressure side: the concave surface of the aerofoil portion that experiences the highest pressure.

Suction side: the convex surface of the aerofoil portion that experiences the lowest pressure.

Leading edge: the front or nose of the aerofoil or platform portion, which meets the working fluid first.

Trailing edge: the rear or tail of the aerofoil or platform portion, from which the working fluid exits.

SUMMARY OF THE INVENTION

According to the present invention, a static blade for an axial flow turbine comprises:
 a) an aerofoil portion having a leading edge, a trailing edge, a pressure side, a suction side, and a chord line;
 b) radially inner and outer platform portions integral with the aerofoil portion;
 c) a corner fillet where the aerofoil portion meets each platform portion to form a smooth transition between the aerofoil portion and each platform portion;
 d) each platform portion in plan view comprising
  i) a trailing edge formed to extend circumferentially of the turbine axis,
  ii) a straight side edge on each of the pressure side and the suction side of the aerofoil,
  iii) a curved leading edge that joins the side edges to each other and that in plan view has a shape that follows the edge of the corner fillet in the region of the leading edge of the aerofoil portion.

For easy fitting of the blades into the diaphragm during assembly, the side edges of each platform portion are substantially parallel to each other and to the chord line of the aerofoil portion. The relevant chord line may be the mean chord line of the aerofoil portion but is preferably the chord line of the aerofoil portion where it meets the relevant platform portion.

To minimise the amount of material in the platform portions, the side edge of each platform portion on the pressure side of the aerofoil portion is tangential to the corner fillet at the leading and trailing edges of the aerofoil portion, i.e., as seen in plan view, the side edge of the platform portion on the pressure side of the aerofoil portion should be spaced away from the chord line by only the width of the corner fillet.

Similarly, on the suction side of the aerofoil portion, it is preferred that the side edge of at least the inner platform portion is tangential to the corner fillet. Furthermore, it is preferred that the curved leading edge of the platform portion has a shape that follows the edge of the corner fillet between the leading edge of the aerofoil and the point at which the side edge of the platform portion on the suction side of the aerofoil is tangential to the corner fillet. In practice, it may be necessary for the side edge and the curved leading edge of the outer platform portion on the suction side of the blade to be spaced apart from the corner fillet.

A second aspect of the invention provides an axial flow turbine diaphragm construction comprising an annular array or annulus of the above static turbine blades and inner and outer spacer rings having apertures therein shaped to accommodate the inner and outer platform portions respectively, whereby the platform portions and the spacer rings together form inner and outer port walls of the turbine diaphragm.

As described below, the inner and outer platform portions are welded into the matching apertures provided in the inner and outer spacer rings.

A third aspect of the invention provides a method of manufacturing the above axial flow turbine diaphragm construction, comprising the steps of:

a) assembling the static blades into the diaphragm by sliding the platform portions into the apertures in the spacer rings,
b) locating an annular cover plate over the annulus of static turbine blades on each side thereof, the cover plates being sized such that inner and outer edges of the cover plates partly overlap the leading and trailing edges of the inner and outer platform portions,
c) welding the inner and outer edges of each cover plate to the leading and trailing edges of the inner and outer platform portions and to intervening portions of the inner and outer spacer rings,
d) machining weld preparation slots into the diaphragm around the inner and outer edges of each cover plate such that the leading and trailing edges of the inner and outer platform portions and any intervening portions of the inner and outer spacer rings are undercut,
e) performing a welding process in the weld preparation slots to fill them and fix the inner and outer platform portions to the inner and outer spacer rings, and
f) machining the inner and outer edges of the cover plates to remove them from the diaphragm.

The above is a generalised procedure and in more detail steps b) and c) are conveniently performed in a sequence comprising:
(i) locating a first annular cover plate over the annulus of static turbine blades on a first side thereof and performing the welding operation for the first annular cover plate; and
(ii) locating a second annular cover plate over the annulus of static turbine blades on a second side thereof and performing the welding operation for the second annular cover plate.

Furthermore, steps d) and e) may be performed in a sequence comprising:
(i) machining a first weld preparation slot into the diaphragm around one of the inner and outer edges of a first cover plate and performing the welding operation in the first weld preparation slot;
(ii) machining a second weld preparation slot into the diaphragm around the other one of the inner and outer edges of the first cover plate and performing the welding operation in the second weld preparation slot;
(iii) machining a third weld preparation slot into the diaphragm around one of the inner and outer edges of a second cover plate and performing the welding operation in the third weld preparation slot; and
(iv) machining a fourth weld preparation slot into the diaphragm around the other one of the inner and outer edges of the second cover plate and performing the welding operation in the fourth weld preparation slot.

BRIEF DESCRIPTION OF THE DRAWINGS

An exemplary embodiment of the invention will now be described, with reference to the accompanying drawings, in which.

DETAILED DESCRIPTION OF A PREFERRED EMBODIMENT

Figure 1A:
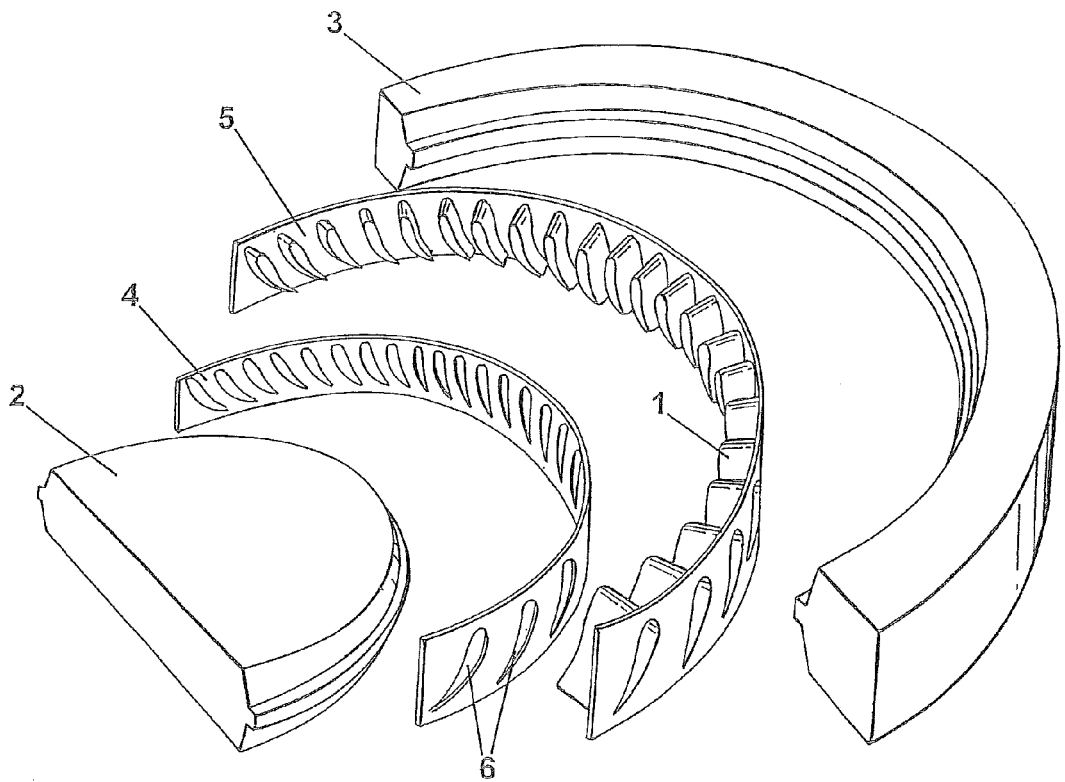
FIG. 1A illustrates the known spacer band type of turbine construction.
Figure 1B:
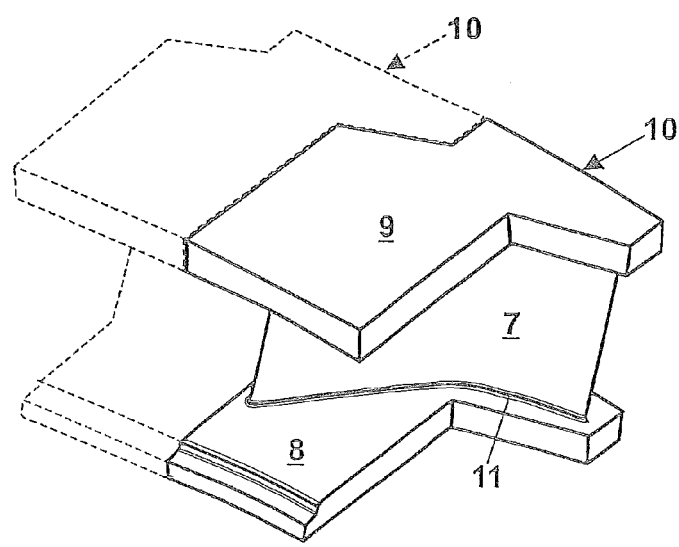
FIG. 1B illustrates a fixed blade with integral platforms for use in the platform type of construction, as already known.
Figure 2:
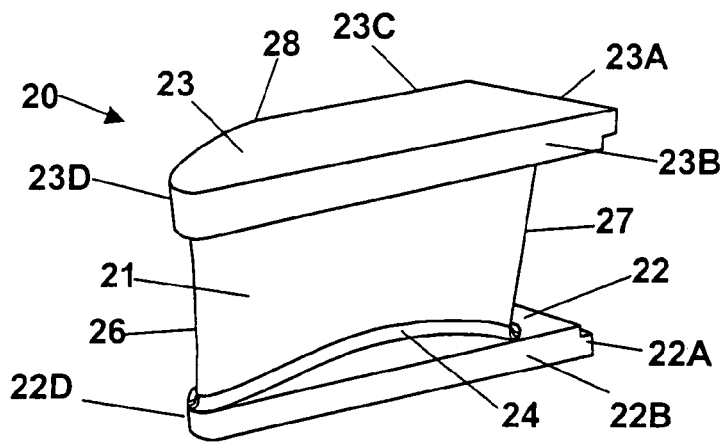
FIG. 2 illustrates a single fixed blade according to the invention.

FIG. 2 shows a static blade 20 for use in a diaphragm construction according to the present invention. It has an aerofoil portion 21 similar to aerofoil 7 of static blade 10 in FIG. 1B. However, although it has integral inner and outer platform portions 22, 23, respectively, they are much smaller than the corresponding platform portions 8, 9 of blade 10. In fact, the opposed side edges 22A, 22B and 23A, 23B of platform portions 22, 23 run substantially parallel to each other and to the chord line of the aerofoil portion and, at least for the inner platform 22, the distance between the side edges is only just sufficient to embrace the cross-section of the aerofoil portion together with its corner fillets 24.

Figure 3A:
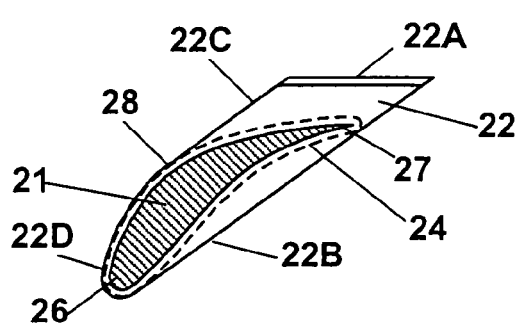
FIGS. 3A to 3D illustrate the blade of FIG. 2 from various viewpoints.
Figure 3B:
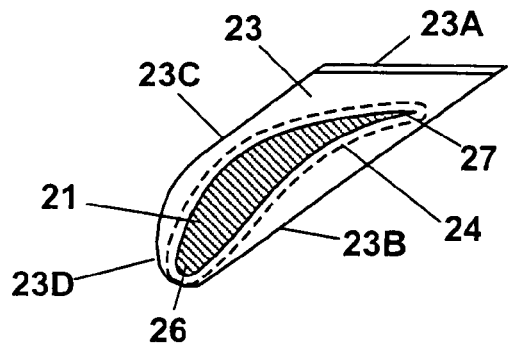
Figures 3C, 3D:
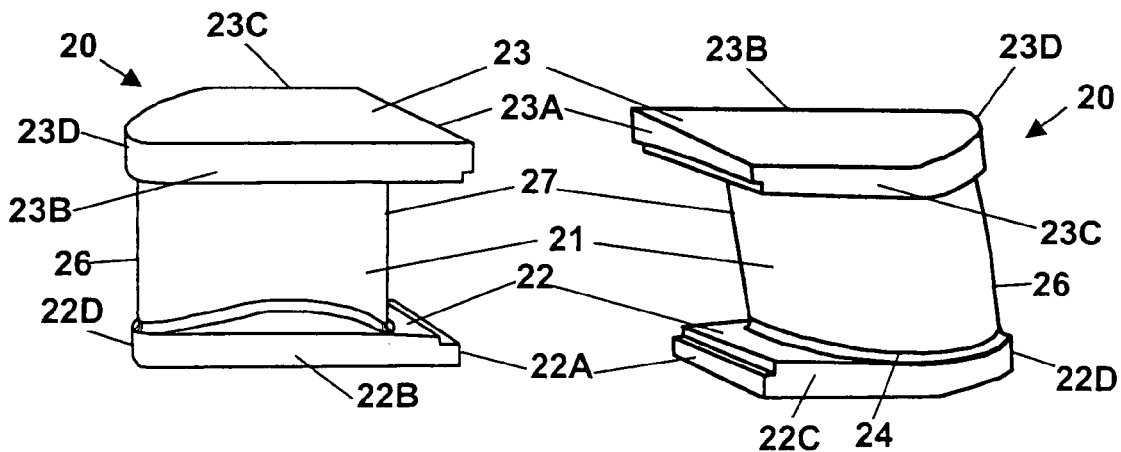

Turning to FIG. 3, FIGS. 3A and 3B are plan views of the platform portions. FIG. 3A is a view looking radially inwards on the radially inner platform portion 22, with the cross-section of the aerofoil 21 shown as the hatched area and the extent of the aerofoil corner fillet 24 shown as the outer dashed line. FIG. 3B is a view looking radially outwards on the radially outer platform 23, again showing the cross-section of the aerofoil 21 and the extent of the aerofoil corner fillet 24. In particular, it should be noted that at and near the leading edge 26 of the aerofoil 21, the leading edges 22D, 23D of the platform portions closely follow the shape of the aerofoil, including the corner fillets. The shaping of the platform portions to accommodate the corner fillets 24 is again evident in FIGS. 3C and 3D which are isometric views on opposite sides of the blade 20.

It will be appreciated from an inspection of the drawings that each platform portion 22, 23 comprises: a trailing edge 22A, 23A formed to extend circumferentially of the turbine axis; a longer linear side edge 22B, 23B on the pressure side of the aerofoil, a shorter linear side edge 22C, 23C on the suction side of the aerofoil; and a curved leading edge 22D, 23D that joins the side edges to each other and that in plan view has a shape that follows the edge of the corner fillet 24, at least in the region of the leading edge 26 of the aerofoil 21. For both the inner and outer platform portions, the side edge 22B, 23B of each platform portion on the pressure side of the aerofoil portion is tangential to the corner fillet 24 at both the leading edge 26 of the aerofoil and its trailing edge 27. For the inner platform portion 22 only, its shorter side edge 22C on the suction side of the aerofoil runs tangentially to the corner fillet 24 and its curved leading edge 22D has a shape that follows the edge of the corner fillet between the leading edge 26 of the aerofoil and the point 28 at which the shorter side edge 22C of the platform portion on the suction side of the aerofoil is tangential to the corner fillet 24. To minimise the amount of material in the outer platform portion 23, it would be preferable if it had the same configuration on the suction side of the blade as the inner platform portion 22. However, due to the design of the aerofoil and the fact that the outer platform portion 23 is at a larger diameter than the inner platform portion 22, it is necessary that the side edge 23C and the curved leading edge 23D of the outer platform portion on the suction side of the blade are spaced apart from the corner fillet by a small amount.

In comparison with the "platform construction" shown in FIG. 1B, the skilled person will appreciate that because blades according to the invention span a much smaller distance in the circumferential direction, practice of the invention:

- enables the blades to be manufactured from alloy slab or plate instead of specific bar sizes, which simplifies material ordering and stock requirements
- reduces the amount of material to be removed by machining
- reduces machining time.

Figure 4:
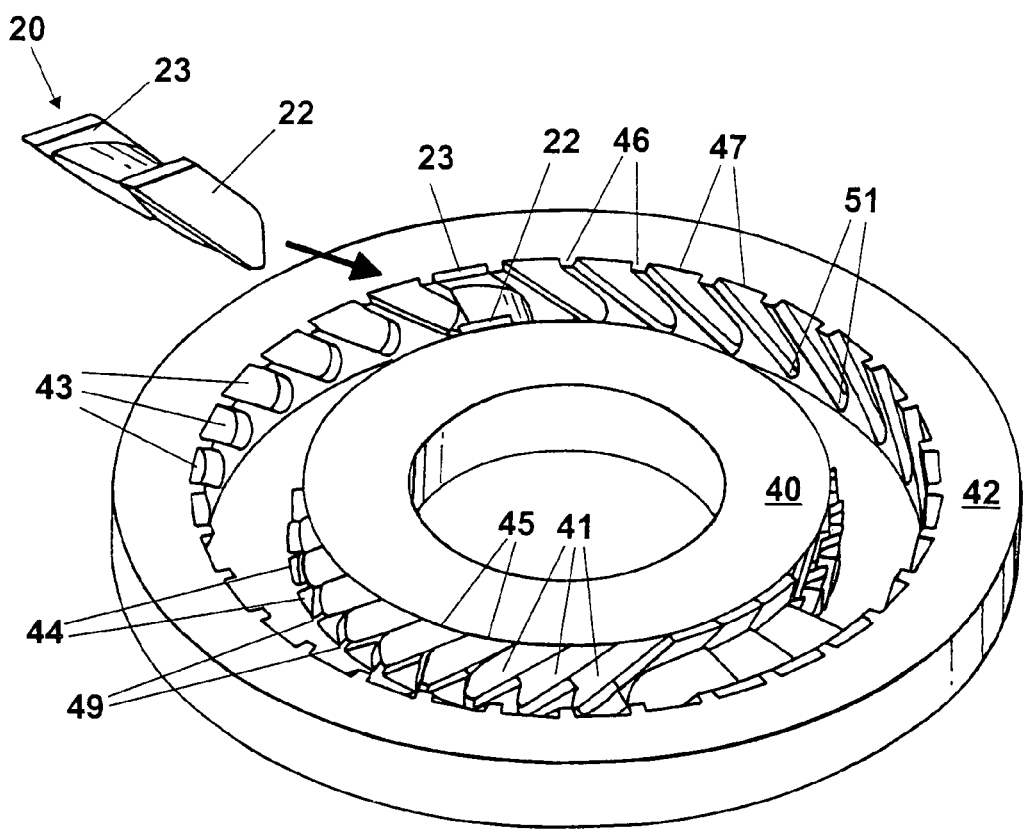
FIG. 4 illustrates the assembly of a steam turbine diaphragm according to the invention.

Turning now to FIG. 4, which illustrates the diaphragm initial assembly process, it will be seen that radially inner and outer spacer rings 40, 42, are formed with slots 41, 43, respectively. The slots 41, 43 are machined in the spacer rings as matching female shapes to the platform male shapes so that the reduced size platform portions 22, 23 are a close but sliding fit within the slots. The inner and outer spacer rings 40, 42 are held concentric with each other in a jig (not shown), and the inner and outer platform portions 22, 23 are slid into their matching slots 41, 43, as shown. It will be noticed that whereas the slots 41, 43 are open at one end 45, 47 to receive the platform portions, they are closed, or at least narrowed, at their other ends 49, 51 to provide an end-stop positive location for the platform portions in the spacer rings. As already mentioned, the shape of the platforms at and near the leading edge 26 of the aerofoil approximates to the shape of the aerofoil 21, so the corresponding ends 49, 51 of the slots are shaped likewise.

Upon assembly of the blades 20 into the spacer rings 40, 42, smooth port walls are established, because care is taken during machining of the slots and platform portions to ensure that they are of matching radial thickness. Hence, the port walls consist of the platform portions 22, 23 and "filler portions" 44, 46 of the spacer rings between the slots 41, 43.

Figure 5A:
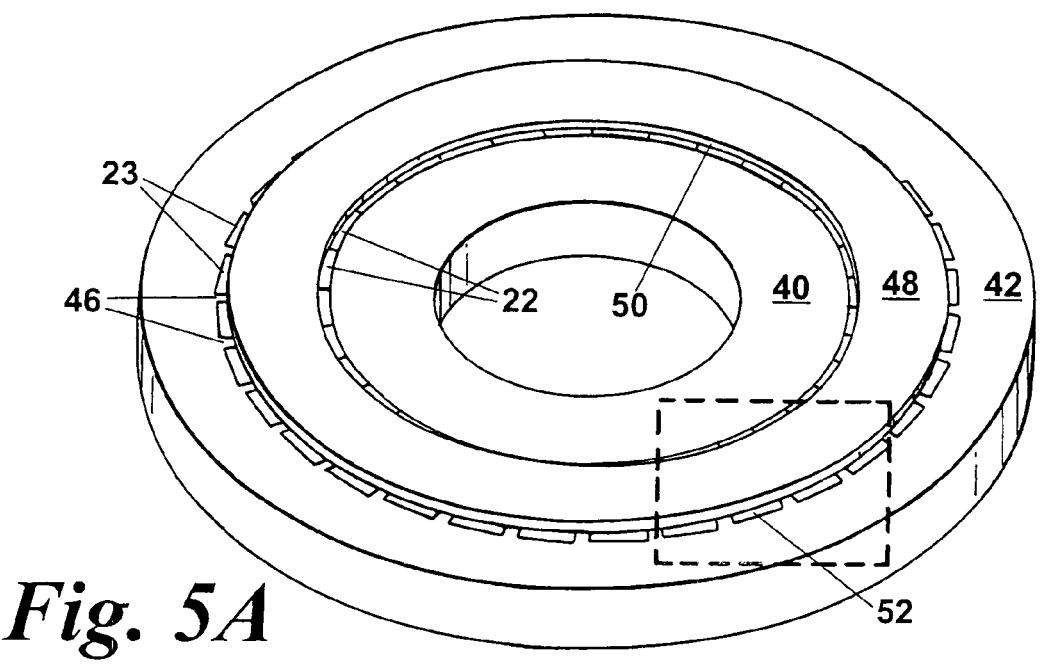
FIGS. 5A and 5B illustrate processes prior to a main welding operation by means of which the blades and the spacer rings are secured together, FIG. 5B being an enlarged portion of FIG. 5A within the dashed rectangle.
Figure 5B:
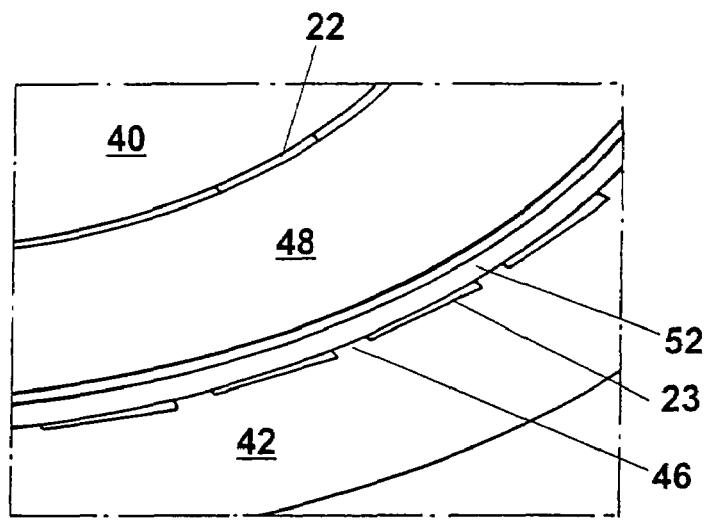

Once all the blades 20 have been assembled into the spacer rings 40, 42, they must be securely welded into position. To accomplish this without risk of damaging the aerofoils, a temporary cover plate 48 is used as shown in FIG. 5A. This is sized to locate on and partly overlap the edges of the inner and outer port walls and is held concentric with the diaphragm. The radially outer and inner edges of the cover plate 48 are then fixed to the leading edge faces 22D, 23D of the platform portions 22, 23 and the intervening filler portions 44, 46 of the spacer rings 40, 42 by fillet welds 50, 52. Fillet weld 52 is more clearly shown in FIG. 5B. A similar cover plate (not shown) is also welded onto the other side of the diaphragm in the same position. This fixes and supports the platform portions and filler segments for subsequent machining, machining which is necessary to enable secure welding of the platform portions to the inner and outer spacer rings.

Figure 6:
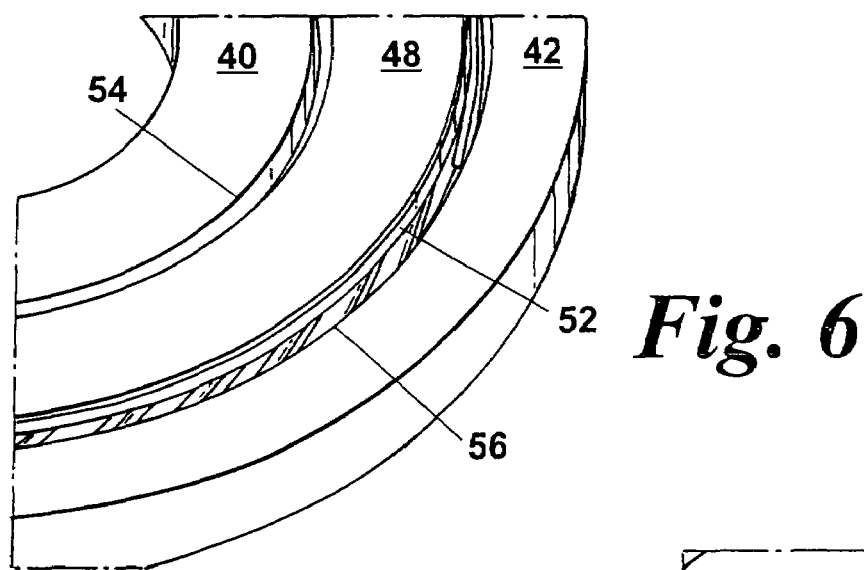
FIG. 6 illustrates the result of a machining operation prior to the main welding operation.
Figure 7:
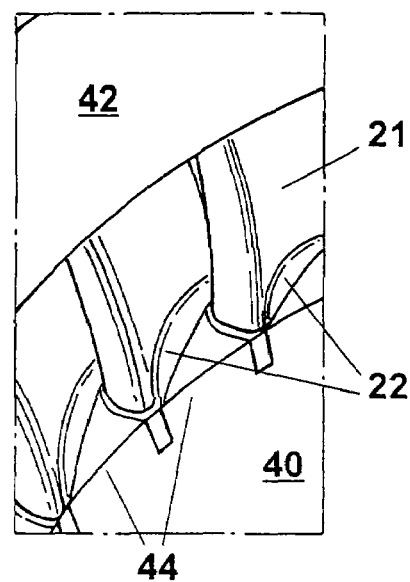
FIG. 7 illustrates a group of the blades in the diaphragm after completion of the main welding operation.

Once the cover plates have been welded into position, machining operations undercut (say) the outer platform portions 23 and the filler portions 46 at the outer circumference of the cover plate 48, on the steam outlet side of the diaphragm. The resulting weld preparation slot 56 is shown in FIG. 6. After machining of slot 56 is complete, a sub-arc welding operation is performed in it, which fills it and fixes the outer platforms 23 to the outer spacer rings 42. Note that the cover plate also prevents movement of the undercut spacer ring filler portions during the weld process. Next, a similar slot 54 is machined at the inner circumference of the cover plate and the welding operation is repeated to fix the inner platforms 22 to the inner spacer ring 40. Finally, the same machining and welding processes are performed on the other (steam inlet) side of the diaphragm. The cover plates can then be removed by a machining operation at their edges and the diaphragm is then complete as shown in FIG. 7, except for any features such as flanges that need to be machined into the spacer rings for assembly into the turbine.

The present invention has been described above purely by way of example, and modifications can be made within the scope of the invention as claimed. The invention also consists in any individual features described or implicit herein or shown or implicit in the drawings or any combination of any such features or any generalisation of any such features or combination, which extends to equivalents thereof. Thus, the breadth and scope of the present invention should not be limited by any of the above-described exemplary embodiments. Each feature disclosed in the specification, including the claims and drawings, may be replaced by alternative features serving the same, equivalent or similar purposes, unless expressly stated otherwise.

Any discussion of the prior art throughout the specification is not an admission that such prior art is widely known or forms part of the common general knowledge in the field.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A static blade for an axial flow turbine comprising:
   a) an aerofoil portion having a leading edge, a trailing edge, a pressure side, a suction side, and a chord line;
   b) radially inner and outer platform portions integral with the aerofoil portion;
   c) a corner fillet where the aerofoil portion meets each platform portion to form a smooth transition between the aerofoil portion and each platform portion;
   d) the platform portions in plan view comprising:
      i) a trailing edge formed to extend circumferentially of the turbine axis,
      ii) a straight side edge on each of the pressure side and the suction side of the aerofoil,
      iii) a curved leading edge that joins the side edges to each other and that in plan view has a shape that follows the edge of the corner fillet in the region of the leading edge of the aerofoil portion.

2. A static blade according to claim 1, in which the side edges of each platform portion are substantially parallel to each other and to the chord line of the aerofoil portion.

3. A static blade according to claim 1, in which the side edge of each platform portion on the pressure side of the aerofoil portion is tangential to the corner fillet at the leading and trailing edges of the aerofoil portion.

4. A static blade according to claim 1, in which the side edge of at least the inner platform portion is tangential to the corner fillet on the suction side of the aerofoil portion.

5. A static blade according to claim 4, in which the curved leading edge of the platform portion has a shape that follows an edge of the corner fillet between the leading edge of the aerofoil and a point at which the side edge of the platform portion on the suction side of the aerofoil is tangential to the corner fillet.

6. A static blade according to claim 4, the platform portion being the inner platform portion.

7. A static blade according to claim 1, in which the side edge and the curved leading edge of the outer platform portion on the suction side of the blade are spaced apart from the corner fillet.

8. An axial flow turbine diaphragm construction comprising
an annulus of static turbine blades according to claim 1, and
inner and outer spacer rings having apertures therein shaped to accommodate the inner and outer platform portions respectively,
whereby the platform portions and the spacer rings together form inner and outer port walls of the turbine diaphragm.

9. A method of manufacturing the axial flow turbine diaphragm construction of claim 8, comprising the steps of:
a) assembling the static blades into the diaphragm by sliding the platform portions into the apertures in the spacer rings,
b) locating an annular cover plate over the annulus of static turbine blades on each side thereof, the cover plates being sized such that inner and outer edges of the cover plates partly overlap the leading and trailing edges of the inner and outer platform portions,
c) welding the inner and outer edges of each cover plate to the leading and trailing edges of the inner and outer platform portions and to intervening portions of the inner and outer spacer rings,
d) machining weld preparation slots into the diaphragm around the inner and outer edges of each cover plate such that the leading and trailing edges of the inner and outer platform portions and any intervening portions of the inner and outer spacer rings are undercut,
e) performing a welding process in the weld preparation slots to fill them and fix the inner and outer platform portions to the inner and outer spacer rings, and
f) machining the inner and outer edges of the cover plates to remove them from the diaphragm.

10. A method according to claim 9, in which steps b) and c) are performed in a sequence comprising:
i) locating a first annular cover plate over the annulus of static turbine blades on a first side thereof and performing the welding operation for the first annular cover plate; and
ii) locating a second annular cover plate over the annulus of static turbine blades on a second side thereof and performing the welding operation for the second annular cover plate.

11. A method according to claim 9, in which steps d) and e) are performed in a sequence comprising:
i) machining a first weld preparation slot into the diaphragm around one of the inner and outer edges of a first cover plate and performing the welding operation in the first weld preparation slot;
ii) machining a second weld preparation slot into the diaphragm around the other one of the inner and outer edges of the first cover plate and performing the welding operation in the second weld preparation slot;
iii) machining a third weld preparation slot into the diaphragm around one of the inner and outer edges of a second cover plate and performing the welding operation in the third weld preparation slot; and
iv) machining a fourth weld preparation slot into the diaphragm around the other one of the inner and outer edges of the second cover plate and performing the welding operation in the fourth weld preparation slot.

12. An axial flow turbine diaphragm construction comprising:
a) an annulus of static turbine blades having an aerofoil portion with integral inner and outer platform portions, and
b) inner and outer spacer rings having apertures therein shaped to accommodate the inner and outer platform portions respectively, whereby the platform portions and the spacer rings together form inner and outer port walls of the turbine diaphragm,
wherein the turbine blades each have a corner fillet where the aerofoil portion meets each platform portion to form a smooth transition between the aerofoil portion and each platform portion, each platform portion comprising:
i) a trailing edge formed to extend circumferentially of the turbine axis,
ii) a straight side edge on each of the pressure side and the suction side of the aerofoil,
iii) a curved leading edge that joins the side edges to each other and that in plan view has a shape that follows the edge of the corner fillet in the region of the leading edge of the aerofoil portion.

13. An axial flow turbine diaphragm construction according to claim 12, in which the side edges of each platform portion are substantially parallel to each other and to the chord line of the aerofoil portion.

14. An axial flow turbine diaphragm construction according to claim 12, in which the side edge of each platform portion on the pressure side of the aerofoil portion is tangential to the corner fillet at the leading and trailing edges of the aerofoil portion.

15. An axial flow turbine diaphragm construction according to claim 12, in which the side edge of at least the inner platform portion is tangential to the corner fillet on the suction side of the aerofoil portion.

16. An axial flow turbine diaphragm construction according to claim 15, in which the curved leading edge of the platform portion has a shape that follows the edge of the corner fillet between the leading edge of the aerofoil and a point at which the side edge of the platform portion on the suction side of the aerofoil is tangential to the corner fillet.

17. An axial flow turbine diaphragm construction according to claim 16, the platform portion being the inner platform portion.

18. An axial flow turbine diaphragm construction according to claim 12, in which the side edge and the curved leading edge of the outer platform portion on the suction side of the blade are spaced apart from the corner fillet.

* * * * *